Sept. 30, 1924.

G. G. SAWTELLE 1,509,906

WIRE LINE LUBRICATOR

Filed July 17, 1922   2 Sheets-Sheet 1

WITNESS: H. A. LaClair

G. G. Sawtelle INVENTOR

BY Victor J. Evans ATTORNEY

Sept. 30, 1924.

G. G. SAWTELLE 1,509,906

WIRE LINE LUBRICATOR

Filed July 17, 1922

G. G. Sawtelle
INVENTOR

BY Victor J. Evans
ATTORNEY

WITNESS: H. A. LaClair

Patented Sept. 30, 1924.

1,509,906

UNITED STATES PATENT OFFICE.

GILBERT GOSS SAWTELLE, OF ARKANSAS CITY, KANSAS.

WIRE-LINE LUBRICATOR.

Application filed July 17, 1922. Serial No. 575,562.

*To all whom it may concern:*

Be it known that I, GILBERT G. SAWTELLE, a citizen of the United States, residing at Arkansas City, in the county of Cowley and State of Kansas, have invented new and useful Improvements in Wire-Line Lubricators, of which the following is a specification.

The object of my said invention is the provision of a simple, easily adjusted and efficient apparatus for oiling wire lines such as used in oil well drilling and which it is necessary to maintain in a thoroughly lubricated state.

To the attainment of the foregoing, the invention consists in the improvement as hereinafter described and definitely claimed.

In the accompanying drawings, forming part of this specification:—

Figures 7, 8 and 9 are detail views of elements hereinafter explicitly referred to.

Similar numerals of reference designate corresponding parts in all of the views of the drawings.

Figure 1:
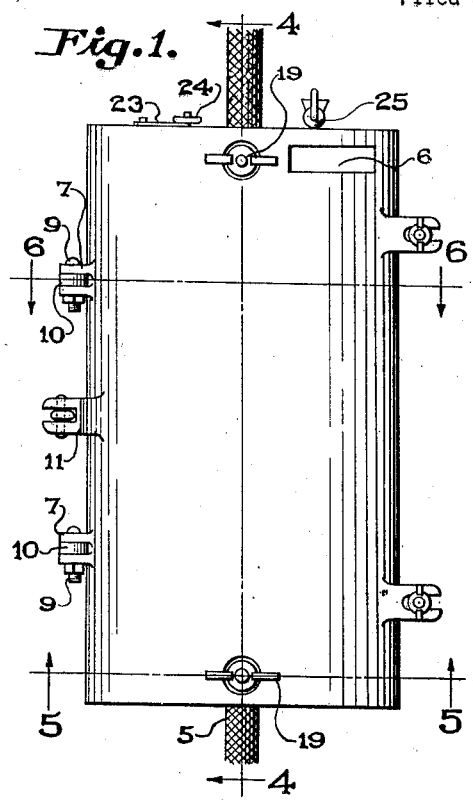
Figure 1 is an elevation showing one side of my novel wire line lubricator.
Figure 2:
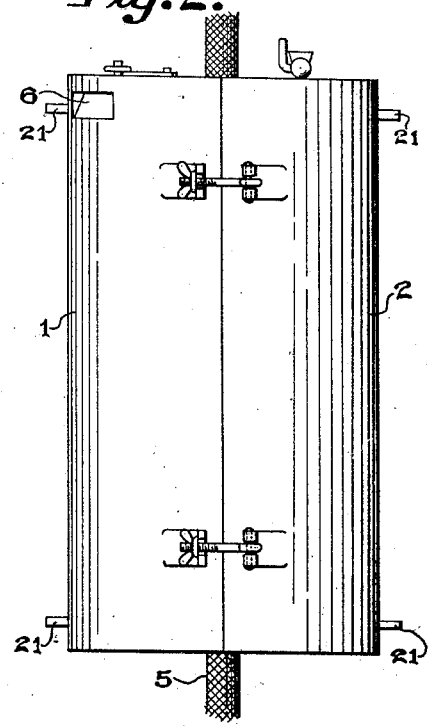
Figure 2 is an elevation taken at right angles to Figure 1.
Figure 3:
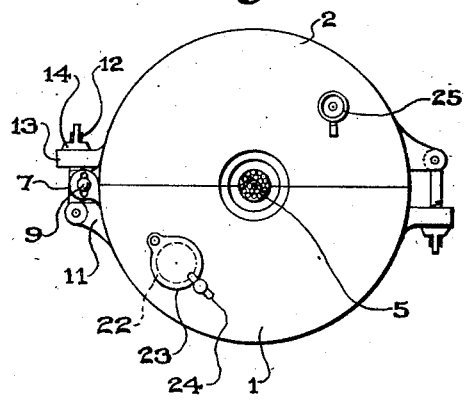
Figure 3 is a top plan view of the apparatus.
Figure 5:
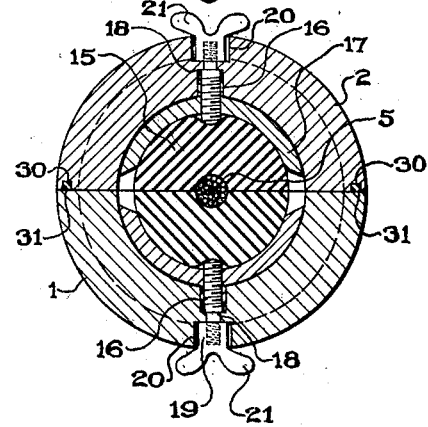
Figure 5 is a horizontal section taken in the plane indicated by the line 5—5 of Figure 1.
Figure 4:
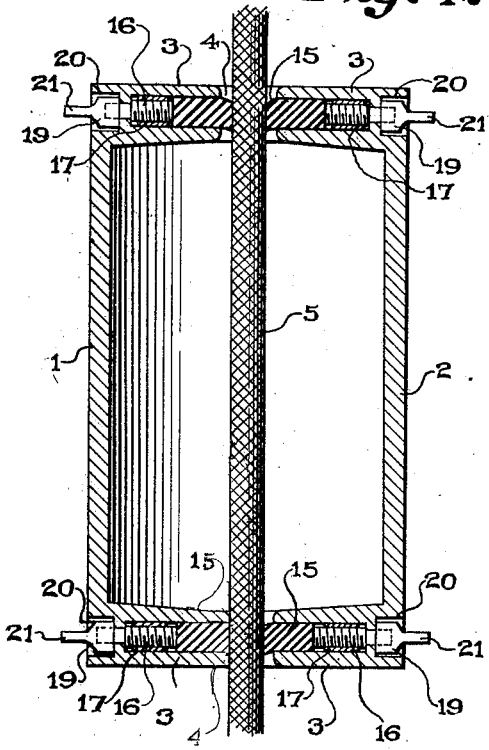
Figure 4 is a vertical central section taken in the plane indicated by the line 4—4 of Figure 1.
Figure 6:
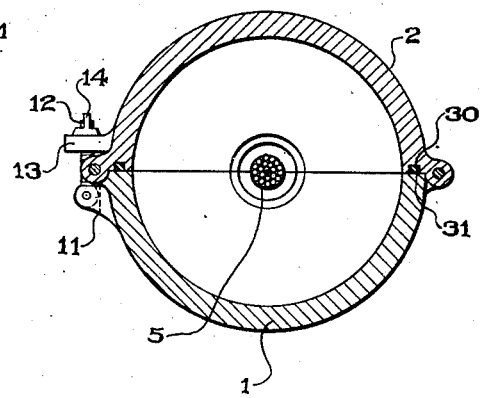
Figure 6 is a horizontal section taken in the plane indicated by the line 6—6 of Figure 1.
Figure 7:
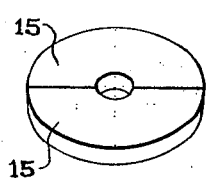
Figure 8:
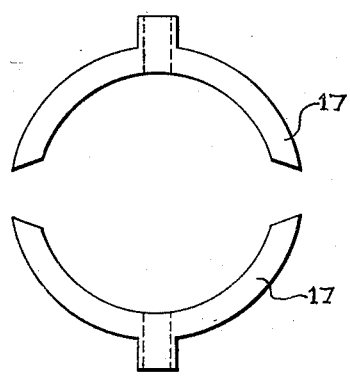
Figure 9:
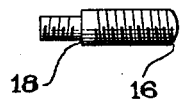

Among other elements my novel device for oiling wire lines comprises a casing body made up of two semi-cylindrical sections 1 and 2. Each of the said sections is provided with a comparatively thick bottom wall 3 and the said bottom walls 3 are provided with meeting recesses 4 in their edges to afford a central opening in the bottom of the casing for the passage of the wire line indicated by 5. Each casing section is also provided near its upper end with a hand hole 6 to facilitate movement of the device, and each casing section is further provided with lugs, the lugs of the section 1 being designated by 7 and being pivotally connected at 9 to the lugs 10 of the section 2. One section is also equipped at 11 with a lug for the pivotal connection of a threaded bolt 12, and the other section has a bifurcated lug 13 to receive the said bolt 12; a wing nut 14 being mounted on the bolt 12 in the relation illustrated so that the casing can be held under pressure in a closed state. At 15 are the lower rubbers or packing sections of the device and at 16 are bolts bearing in the lower portion of the casing sections and designed in conjunction with followers 17 to tighten the rubbers or packing sections about the wire line.

Each of the bolts 16 is provided with a left hand thread, and each bolt has a shoulder 18 which abuts against the casing section in which the bolt is arranged. The outer reduced portion of each bolt 16 is threaded for the engagement of a nut 19, disposed in a recess 20 of the casing section and equipped with wings 21. The bolts are threaded through the followers 17 and bear against the rubbers or packing section 15, and consequently when either bolt is turned toward the right, the follower engaged by the bolt will be moved inwardly and the rubber or packing section 15 will be closed against the wire line or cable 5.

The upper ends of the sections 1 and 2 are equipped with rubbers or packing sections 15, bolts 16, followers 17 and nuts 19 similar to those described with reference to the lower ends of the sections.

It will also be noted that one of the sections is provided at its upper end with a filling opening 22 for the introduction of oil, the said opening 22 being normally closed by a lid 23 appropriately clamped at 24 in detachable manner in closed position.

At 25 one of the casing sections is provided with a threaded aperture to receive a pet cock, Figure 1, for the purpose of venting air from the casing incident to the filling of the same with oil. One of the sections of the casing is provided with a groove 30 which extends entirely about its edge and carries a rubber gasket 31, the said gasket being designed when the sections are clamped together to render the joint between the sections oil tight.

In virtue of the sections being constructed in the manner described and connected through the medium of the means set forth it will be apparent that any wear that may take place may be expeditiously and easily taken up.

It will also be apparent from the foregoing that my novel device is capable of being applied about a line while tools or other appurtenances are on the line; also, that my improved device is adapted to be made in various sizes so as to hold from one to one and one-half gallons of heavy oil, and to be used to advantage in lubricating lines or cables of various diameters.

The rubbers may be made of various sizes so as to accommodate them to a one-half inch hole or passage for a sand line to a one inch hole for drilling lines, the drilling lines varying in sizes from three-fourths of an inch to one inch.

My novel lubricator is in effect a tube secured about a wire line, and is oil tight at the side, top and bottom notwithstanding the provision made for the passage of the wire line or cable. From this it follows that the device is adapted to retain oil while pulling a wire from a well, and the device is also adapted to be used in a horizontal position as well as in a perpendicular position.

I have entered into a detailed description of the construction and relative arrangement of the parts embraced in the present and preferred embodiment of the invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. A wire line lubricator comprising a casing adapted to be secured in closed state about a line, and means carried by the casing at the side and ends thereof to retain oil therein, and including rubbers or packing sections adapted for the passage of a line; the said casing including sections hingedly connected together and each provided with end portions, and means detachably connecting the sections and constructed and arranged to hold the same in closed state against each other.

2. A wire line lubricator comprising a casing adapted to be secured in closed state about a line, and means carried by the casing at the side and ends thereof to retain oil therein, and including rubbers or packing sections carried by the casing, said rubbers or packing sections adapted for the passage of a line; the said casing including sections hingedly connected together and each provided with end portions, and means detachably connecting the sections and constructed and arranged to hold the same in closed state against each other, and each of the casing sections being provided with a handle.

3. A wire line lubricator comprising a casing with a side and ends adapted to be secured around a line, and means in the casing to retain oil and including rubbers or packing sections in the end of the casing and adapted for the passage between them of a line, and adjustable means cooperating with the casing and the said rubbers or packing sections to maintain the latter under inward pressure, said means comprising followers back of the rubbers or packing sections, threaded bolts, and nuts complementary to the bolts.

In testimony whereof I affix my signature.

GILBERT GOSS SAWTELLE.